(12) United States Patent
Jilek et al.

(10) Patent No.: US 10,734,683 B2
(45) Date of Patent: Aug. 4, 2020

(54) ADDITIVE CONTAINING ELECTROLYTES FOR HIGH ENERGY RECHARGEABLE METAL ANODE BATTERIES

(71) Applicant: Viking Power Systems Pte. Ltd., Singapore (SG)

(72) Inventors: Robert Jilek, Belmont, MA (US); Robert Ellis Doe, Medfield, MA (US); David Eaglesham, Lexington, MA (US); Andrew J. Gmitter, Lansdale, PA (US); Jocelyn M. Newhouse, Somerville, MA (US); Matthew Trahan, Franklin, MA (US)

(73) Assignee: Viking Power Systems Pte. Ltd., Singapore (SG)

(*) Notice: Subject to any disclaimer, the term of this patent is extended or adjusted under 35 U.S.C. 154(b) by 86 days.

(21) Appl. No.: 15/676,598

(22) Filed: Aug. 14, 2017

(65) Prior Publication Data

US 2018/0048017 A1    Feb. 15, 2018

Related U.S. Application Data

(60) Provisional application No. 62/374,241, filed on Aug. 12, 2016.

(51) Int. Cl.
*H01M 10/0567* (2010.01)
*H01M 2/14* (2006.01)
(Continued)

(52) U.S. Cl.
CPC ......... *H01M 10/0567* (2013.01); *H01M 2/14* (2013.01); *H01M 4/382* (2013.01);
(Continued)

(58) Field of Classification Search
None
See application file for complete search history.

(56) References Cited

U.S. PATENT DOCUMENTS

| 5,314,765 A | 5/1994 | Bates |
|---|---|---|
| 5,422,203 A | 6/1995 | Guyomard |

(Continued)

FOREIGN PATENT DOCUMENTS

| EP | 2 528 152 A1 | 11/2012 |
|---|---|---|
| EP | 2 660 906 A1 | 6/2013 |

(Continued)

OTHER PUBLICATIONS

Grebel et al., "Towards bi-carrier ion-transistors: DC and optically induced effects in electrically controlled electrochemical cell" Electrochemical Acta, 95:308-312. Apr. 2013 (Year: 2013).*

(Continued)

*Primary Examiner* — Alix E Eggerding
(74) *Attorney, Agent, or Firm* — Downs Rachlin Martin PLLC

(57) ABSTRACT

Electrolytes for use in commercially viable, rechargeable lithium metal batteries are described. The electrolytes contain one or more lithium salts, one or more organic solvents, and one or more additives. The electrolytes allow for reversible deposition and dissolution of lithium metal. Specific additives or additive combinations dramatically improved cycle life, decrease cell swelling, and/or lower cell impedance.

22 Claims, 3 Drawing Sheets

(51) Int. Cl.
  *H01M 4/38* (2006.01)
  *H01M 10/0568* (2010.01)
  *H01M 10/0569* (2010.01)
  *H01M 10/44* (2006.01)
  *H01M 10/052* (2010.01)
  *H01M 10/46* (2006.01)
  *H01M 10/42* (2006.01)
  *H01M 4/02* (2006.01)

(52) U.S. Cl.
  CPC ..... *H01M 10/052* (2013.01); *H01M 10/0568* (2013.01); *H01M 10/0569* (2013.01); *H01M 10/44* (2013.01); *H01M 10/46* (2013.01); *H01M 2004/027* (2013.01); *H01M 2010/4292* (2013.01); *H01M 2300/0025* (2013.01)

(56) References Cited

U.S. PATENT DOCUMENTS

| | | | |
|---|---|---|---|
| 5,601,951 | A | 2/1997 | Johnson |
| 5,620,811 | A | 4/1997 | Zhang et al. |
| 6,168,884 | B1 * | 1/2001 | Neudecker .......... H01M 4/0447 429/104 |
| 6,258,478 | B1 | 7/2001 | Kim |
| 6,402,795 | B1 | 6/2002 | Chu |
| 6,706,447 | B2 | 3/2004 | Gao |
| 7,524,579 | B1 | 4/2009 | Jow et al. |
| 7,776,465 | B1 | 8/2010 | Hatazawa |
| 7,883,797 | B2 | 2/2011 | Kishi |
| 8,460,808 | B2 | 6/2013 | Toia |
| 8,597,833 | B2 | 12/2013 | Hwang |
| 8,715,865 | B2 | 5/2014 | Ku |
| 8,728,670 | B2 | 5/2014 | Inagaki et al. |
| 8,834,180 | B2 | 9/2014 | Woo |
| 8,865,350 | B2 | 10/2014 | Yamada |
| 9,114,382 | B2 | 8/2015 | Visconti |
| 9,160,036 | B2 | 10/2015 | Yang et al. |
| 9,887,415 | B2 | 2/2018 | Fischer |
| 2001/0008728 | A1 | 7/2001 | Turner |
| 2003/0076074 | A1 | 4/2003 | Kawai |
| 2004/0021442 | A1 | 2/2004 | Higashino |
| 2006/0251968 | A1 | 11/2006 | Tsukamoto |
| 2007/0166617 | A1 | 7/2007 | Gozdz |
| 2007/0231707 | A1 | 10/2007 | Abe |
| 2008/0026297 | A1 | 1/2008 | Chen et al. |
| 2008/0118845 | A1 | 5/2008 | Ihara |
| 2008/0182172 | A1 | 7/2008 | Takamuku |
| 2009/0008031 | A1 | 1/2009 | Gould |
| 2009/0035662 | A1 | 2/2009 | Scott |
| 2011/0006738 | A1 | 1/2011 | Mikhaylik et al. |
| 2011/0076556 | A1 | 3/2011 | Karthikeyan |
| 2011/0081577 | A1 | 4/2011 | Gozdz |
| 2011/0104574 | A1 | 5/2011 | Shembel et al. |
| 2013/0059178 | A1 | 3/2013 | Ihara |
| 2013/0157147 | A1 * | 6/2013 | Li .................... H01M 4/525 429/332 |
| 2013/0164584 | A1 | 6/2013 | Scott |
| 2013/0171514 | A1 | 7/2013 | Mio |
| 2014/0038053 | A1 * | 2/2014 | Endo ................. H01M 4/0471 429/223 |
| 2014/0120409 | A1 | 5/2014 | Ouchi |
| 2015/0030937 | A1 | 1/2015 | Shembel et al. |
| 2015/0050543 | A1 | 2/2015 | Christensen et al. |
| 2016/0006081 | A1 | 1/2016 | Eaglesham |
| 2016/0079626 | A1 | 3/2016 | Bae et al. |
| 2016/0126532 | A1 | 5/2016 | Eaglesham et al. |
| 2016/0126592 | A1 * | 5/2016 | Saito ................. H01M 10/0567 429/338 |
| 2016/0172660 | A1 | 6/2016 | Fischer et al. |
| 2016/0172661 | A1 | 6/2016 | Fischer et al. |
| 2016/0172711 | A1 | 6/2016 | Yang et al. |
| 2016/0197376 | A1 | 7/2016 | Koshiba |
| 2016/0204432 | A1 | 7/2016 | Koshiba |
| 2016/0261000 | A1 | 9/2016 | Zhang |
| 2016/0344063 | A1 | 11/2016 | Chang |
| 2017/0033406 | A1 | 2/2017 | Zhang |
| 2018/0102531 | A1 | 4/2018 | Fischer |
| 2018/0102532 | A1 | 4/2018 | Fischer |
| 2019/0036179 | A1 | 1/2019 | Downie |
| 2019/0036180 | A1 | 1/2019 | Downie |

FOREIGN PATENT DOCUMENTS

| | | |
|---|---|---|
| EP | 2 768 064 A1 | 8/2014 |
| WO | 2015033619 | 12/2015 |
| WO | 2016094750 A1 | 6/2016 |

OTHER PUBLICATIONS

International Search Report dated Nov. 3, 2017 in the corresponding PCT application PCT/US2017/046685.

Written Opinion dated Nov. 3, 2017 in the corresponding PCT application PCT/US2017/046685.

Campion, C.L. et al., Suppression of Toxic Compounds Produced in the Decomposition of Lithium-Ion Battery Electrolytes, Electrochemical and Solid-State Letters, vol. 7, pp. A194-A197 (May 12, 2004).

Xu, Kang Nonaqueous Liquid Electrolytes for Lithium-Based Rechargeable Batteries Chem. Rev. 2004, 104, 4303-4417 published Sep. 16, 2004.

Winter, M. Blends of lithium bis(oxalate)borate and lithium tetrafluoroborate: useful substitutes for lithium difluoro (oxalato)borate in electrolytes for lithium metal based secondary batteries? Electrochimica Acta, 2013, 107, 26-32 available online Jan. 10, 2013.

Wu, F., A diisocyanate/sulfone binary electrolyte based on lithium difluoro(oxalate)borate for lithium batteries, . Mater. Chem. A, 2013, 1, 3659 (Jan. 10, 2013).

Xu et ai, 'Lithium metal anodes for rechargeable batteries', Energy & Environmental Science, vol. 7, Oct. 29, 2013, p. 513-537.

Wang D.Y. et al., A systematic study of well-known electrolyte additives in LiCoO2/graphite pouch cells, Journal of Power Sources 251 (2014) 311-318 Available online Dec. 3, 2013.

Huang, W et al., 4-(Trifluoromethyl)-benzonitrile: A novel electrolyte additive for lithium nickel manganese oxide aathode of high voltage lithium ion battery, Journal of Power Sources 267 (2014) 560-565 Available online Jun. 4, 2014.

Dahn, J.R. et. al. Ternary and Quaternary Electrolyte Additive Mixtures for Li-ion Cells that Promote Long Lifetime, High Discharge Rate, and Better Safety, JES, 2014, vol. 161, pp. A1261-A1265 Published Jun. 7, 2014.

Petibon, R. ar al., Study of the Consumption of Vinylene Carbonate in Li[Ni0.33Mn0.33Co0.33]O2/Graphite Pouch ells, Journal of the Electrochemical Society, 161 (10) A1618-A1624 (Jul. 11, 2014).

Wu et al, 'Ionic liquid-based electrolyte with binary lithium salts for high performance lithium-sulfur batteries', Journal of Power Sources, vol. 296,Jul. 18, 2015, p. 10-17.

USPTO; Non-Final Office Action dated Mar. 29, 2017, in U.S. Appl. No. 14/966,100.

USPTO; Final Office Action dated Jul. 20, 2017, in U.S. Appl. No. 14/966,100.

USPTO; Notice of Allowance dated Oct. 19, 2017, in U.S. Appl. No. 14/966,100.

PCT; Int'l Search Report and Written Opinion dated Nov. 25, 2018, in App. No. PCT/US2018/044429.

PCT; Int'l Search Report dated Mar. 18, 2019, in Appl. No. PCT/US2018/066557.

PCT; Written Opinion dated Mar. 18, 2019, in Appl. No. PCT/US2018/066557.

Aurbach et al., "Prototype Systems for Rechargeable Magnesium Batteries," Nature, vol. 407 (6805), pp. 724-727 (2000).

Aurbach et al., "Nonaqueous Magnesium Electrochemistry and its Application in Secondary Batteries," The Chemical Record, vol. 3, pp. 61-73 (2003).

Brandt, "Historical Development of Secondary Lithium Batteries," Solid State Ionics, vol. 69 (3-4), pp. 173-183 (1994).

(56) References Cited

OTHER PUBLICATIONS

Chalasani et al. "Methylene Ethylene Carbonate: Novel Additive to Improve the High Temperature Performance of Lithium Ion Batteries," Journal of Power of Sources, vol. 208, pp. 67-73 (2012).

Dahn, "Electrically Rechargeable Metal-Air Batteries Compared to Advanced Lithium-Ion Batteries," Presented at IBM Almadan Institute (2009).

Harry et al., "Detection of Subsurface Structures Underneath Dendrites Formed on Cycled Lithium Metal Electrodes," Nature Materials, vol. 13, pp. 69-73 (2014).

Gallagher et al., "Manufacturing Costs of Batteries for Electric Vehicles" Lithium-Ion Batteries: Advances and Applications, Chapter 6, pp. 97-126 (2014).

Li et al., "A Review of Lithium Deposition in Lithium-Ion and Lithium Metal Secondary Batteries," Journal of Power of Sources, vol. 254, pp. 168-182 (2014).

Liu et al., "Rechargeable Mg-Ion Batteries Based on WSe2 Nanowire Cathodes" ACS Nano, vol. 7(9), pp. 8051-8058 (2013).

Matsui, "Study on Electrochemically Deposited Mg Metal," Journal of Power Sources, vol. 196(16), pp. 7048-7055 (2011).

Mikhaylik, "Protection of Li Anodes Using Dual Phase Electrolytes," Sion Power, DoE EERE Report, 8 pages (2011).

Nguyen et al., "Improved Cycling Performance of Si Nanoparticle Anodes via Incorporation of Methylene Ethylene Carbonate," Electrochemistry Communications, vol. 66, pp. 71-74 (2016).

Park et al., "A Highly Reversible Lithium Metal Anode," Nature Scientific Reports, vol. 4, Report No. 3815, 8 pages (2014).

Von Sacken et al. "Comparative Thermal Stability of Carbon Intercalation Anodes and Lithium Metal Anodes for Rechargeable Lithium Batteries," Journal of Power Sources, vol. 54(2), pp. 240-245 (1995).

Vaughey et al. "Lithium Metal Anodes," Annual Merit Review, DOE Vehicle Technologies Program, 31 pages (2009).

Zheng et al., "Magnesium Cobalt Silicate Materials for Reversible Magnesium Ion Storage," Electrochimica Acta, vol. 56, pp. 75-81 (2012).

USPTO; Non-Final Office Action dated May 31, 2019, in U.S. Appl. No. 15/839,684.

PCT; International Search Report and Written Opinion dated Mar. 17, 2016, in Appl. No. PCT/US15/65153.

USPTO; Non-Final Office Action dated May 24, 2019, in U.S. Appl. No. 15/839,638.

USPTO; Non-Final Office Action dated Mar. 9, 2018, in U.S. Appl. No. 14/966,392.

USPTO; Final Office Action dated Aug. 31, 2018, in U.S. Appl. No. 14/966,392.

\* cited by examiner

ADDITIVE CONTAINING ELECTROLYTES FOR HIGH ENERGY RECHARGEABLE METAL ANODE BATTERIES

CROSS-REFERENCE TO RELATED APPLICATIONS

This application claims priority to and the benefit of U.S. provisional patent application Ser. No. 62/374,241, filed Aug. 12, 2016, which application is incorporated herein by reference in its entirety.

FIELD OF THE INVENTION

The invention relates to electrochemical cells in general and particularly to secondary electrochemical cells containing non-aqueous electrolytes and metal anodes.

BACKGROUND OF THE INVENTION

Rechargeable or secondary electrochemical storage devices or batteries have wide-ranging applications and improvement of battery performance is a long-standing goal.

Commercial Li-ion batteries contain a graphitic carbon, or alloy, anode capable of "insertion" (or intercalation) of Lithium ions. Therefore in Li-ion batteries the host material affords a protective barrier against reactions with a liquid electrolyte. The electrolyte of Li-ion batteries generally contains a non-aqueous electrolyte comprising lithium hexafluorophosphate ($LiPF_6$) dissolved in a mixture of carbonate solvents, examples of which include ethylene carbonate (EC), dimethyl carbonate (DMC), diethyl carbonate (DEC), and propylene carbonate (PC). In Li-ion batteries both cathode and anode operate by intercalation of Li ions. This creates an opportunity to improve the kinetics of intercalation by use of an electrolyte additive to modify the interface between the electrolyte and the intercalating compound. The additive acts to modify the chemistry and conductivity of a stable Solid Electrolyte Interphase (SEI) that forms between the active electrode and the electrolyte. Thus in Li-ion batteries the use of additives is well-known as a technique to improve the kinetics and stability of the operation of the cell.

Secondary batteries containing Li metal anodes have been a long-standing goal of battery research for decades, but have failed to gain commercial traction. In secondary Li metal cells the anode operation comprises at least in part plating deposition of metallic lithium or lithium alloy at the anode. Most batteries of this type involve a conversion cathode such as sulfur (S). Additives are known in the Li—S cell, which act to prevent parasitic reactions (primarily the poly-sulphide shuttle reactions).

Yet another class of batteries involves a conventional ("intercalation" or "insertion") material as a cathode and plating lithium metal at the anode. We will refer to this as an intercalation/plating cell. In this case it is generally acknowledged that it is not possible to form a stable SEI between Li metal and a liquid electrolyte. Consequently the vast majority of this literature is focused on identifying a coating that separates the Li from the electrolyte. Coatings may be polymeric, solid-electrolyte, graphene, core-shell, "yolk-shell" or "pomegranate", depending on the choice of materials. Such barrier layers to prevent reaction of Li with the electrolyte are also being explored in Li—S batteries. In general for intercalation/plating cells the search for additives to improve cell efficiency has been abandoned. $CsPF_6$ has been proposed as a means to modify the kinetics of the reaction.

$LiPF_6$ has been the primary salt of Li-ion batteries for decades; however its propensity to form HF, $PF_5$, and $POF_3$ in the presence of trace water impurities is expected to be a major problem for Li-metal batteries (Xu, Kang Nonaqueous Liquid Electrolytes for Lithium-Based Rechargeable Batteries *Chem. Rev.* 2004, 104, 4303-4417). Fortunately, a variety of other salts are known to reversibly plate and strip lithium metal with less reactivity towards water. Some non-limiting examples include lithium bis(oxalato)borate (LiBOB), lithium tetrafluoroborate ($LiBF_4$), and lithium bis(trifluoromethanesulfonyl)imide (LiTFSI). When dissolved in carbonate solvents these salts yield coulombic efficiencies as high as 90+% against Li metal, which is far below the 99+% of $LiPF_6$ in traditional Li-ion (Winter, M. Blends of lithium bis(oxalate)borate and lithium tetrafluoroborate: useful substitutes for lithium difluoro(oxalato) borate in electrolytes for lithium metal based secondary batteries? *Electrochimica Acta,* 2013, 107, 26-32).

One way to change cell Coulombic efficiency is via electrolyte modification through the use of chemical additives. It is reportedly best to choose additives that are either more readily oxidized at the cathode or reduced at the anode than electrolyte salts and solvents. To this end, additive mixtures are typically selected so that at least one component is reduced at, and therefore passivates, the anode and another is oxidized at the cathode. This is common practice in the Li-ion industry with commercial cells containing up to 3 or 4 individual low percentage (<2% by mass) additives. Non-limiting examples of additives known to improve stability at either the cathode or the anode include carbonate esters such as vinylene carbonate (VC), vinyl ethylene carbonate (VEC), or fluoroethylene carbonate (FEC), sultones (e.g., 1, 3-propene sultone—PS), sulfonates (methylene methane disulfonate—MMDS), or phosphates such as (tris(-trimethyl-silyl)-phosphate (TTSP) (Dahn, J. R. et. al. Ternary and Quaternary Electrolyte Additive Mixtures for Li-ion Cells that Promote Long Lifetime, High Discharge Rate, and Better Safety, *JES,* 2014, 161, A1261-A1265). There have also been several reports utilizing lithium salts as electrolyte additives. Non-limiting examples include lithium bis(oxalato)borate or lithium difluoro(oxalato)borate (LiDFOB) (EP 2,660,906 A1, U.S. Pat. No. 7,524,579 B1), and lithium methoxide (LiOMe) (US 2011/0006738 A1).

Li-ion (carbonaceous-anode) cells generally utilize additives in fashions that avoid Li metal deposition. For example, one can generate an SEI that alters the rate of electrochemical intercalation and deintercalation of lithium ions to the solid phase of the electrodes (US20110104574 A1, US20150030937 A1), so that the cells can operate at higher C-rates without plating Li metal on the carbon, which is a well-known pitfall of Li-ion batteries. Lithium-Sulfur batteries employing Li metal anodes mainly utilize additives as a means of mitigating the redox-shuttle related to the cathode dissolution and subsequent reduction at the surface of the anode (U.S. Pat. No. 9,160,036 B2) as opposed to improving the reversibility of Li metal in the cell. Alternatively rechargeable Li metal batteries generally coat the anode with a thin layer of polymer, ceramic, or both (e.g., lithium phosphorus oxynitride (LiPON)), which serves as a protective barrier for the Li metal surface. In fact, those practiced in the art have said "because of the enormous challenge involved in stabilizing the Li surface chemically and mechanically through the use of electrolyte additives, the preferred treatment for rechargeable Li-based cells is the use of a solid-electrolyte membrane (US20150050543 A1)."

There is a need for improved rechargeable Li-metal batteries.

SUMMARY OF THE INVENTION

In order to make a commercially viable rechargeable Li-metal battery, novel electrolyte mixtures are required. Replacement of $LiPF_6$ as the primary lithium salt and development of innovative additive combinations are steps that can dramatically improve electrolyte performance in the presence of a lithium metal anode. Significant improvements in Coulombic efficiency preferably should be made to achieve the cycle life requirement of a commercially viable secondary Li metal battery.

The present invention comprises an electrochemical device containing a metal negative electrode; a positive electrode comprising an electrode active material that reversibly intercalates and de-intercalates lithium cations; a barrier comprising any one of a number of porous polyolefin separators preventing the negative electrode from contacting the positive electrode; and a non-aqueous electrolyte contacting the negative and positive electrodes, comprising at least one lithium salt, one or more organic solvents, and one or more chemical additives. In some embodiments the fluid electrolytes comprising at least one lithium salt, one or more organic solvents, and one or more chemical additives are expected to be suitable for secondary lithium battery systems containing N/P ratio <0.9 wherein N/P is defined as the capacity ratio of the negative electrode to positive electrode. In other embodiments the fluid electrolytes comprising at least one lithium salt, one or more organic solvents, and one or more chemical additives are expected to be suitable for secondary lithium battery systems comprising one or more lithium salts comprising at least two of the following elements boron, fluorine, carbon, nitrogen, or oxygen.

Preferred embodiments comprise the following lithium salts: lithium tetrafluoroborate ($LiBF_4$), lithium bis(trifluorosulfonyl)imide (LiTFSI), lithium bis(fluorosulfonyl)imide (LiFSI), lithium bis(oxalate)borate (LiBOB), lithium bis(perfluoroethylsulfonyl)imide (LiBETI), lithium dicyanamide (LiDCA), lithium tricyanomethanide (LiTCM), lithium tetracyanoborate (LiTCB), lithium triflate (LiOTf), lithium difluoro(oxalate)borate (LiDFOB), lithium perfluorobutanesulfonate (LiPFBS), lithium thiocyanate (LiSCN), lithium triflinate ($LiCF_3SO_2$), lithium nitrate ($LiNO_3$), lithium bis(benzenesulfonyl)imide (LiBBI), lithium difluoro(malonato)borate (LiDFMB), lithium bis(perfluoropinacolato)borate, or lithium bis(salicylato)borate (LiBSB). The electrolyte may contain any one or a combination of these salts.

It is noteworthy that hexafluorophosphate ($PF_6^{1-}$), hexafluoroarsenate ($AsF_6^{1-}$), and perchlorate ($ClO_4^{1-}$) are excluded due to lithium salts high propensity to hydrolyze releasing HF, form reactive or explosive adducts, the toxic nature of constituents, poor Coulombic efficiency only enabling many cycles when massive excess of Li metal is present. Their corresponding lithium salts are simply not viable options in commercial rechargeable Li-metal batteries due to both performance and regulatory factors.

In some preferred embodiments, the $Li^+$ molarity is in the range from 0.5 M to 2.5 M.

In still another embodiment, the Li molarity is in the range of 0.1 M to 1 M.

In a further embodiment, the Li molarity is in the range of 1 M to 3 M.

In yet another embodiment, the Li molarity is in the range of 3 M to 8 M.

In still another embodiment, the solution conductivity is greater than 1 mS/cm at 25 degrees Celsius.

In yet a further embodiment, a solution Coulombic efficiency is greater than 98% at 25 degrees Celsius.

A variety of organic solvents are suitable for use in the electrolyte of the present invention. The organic solvents can be used alone or in combination. Whether a solvent comprises a single organic composition or a plurality of organic compositions, for the purposes of further exposition, the organic solvent will be referred to as "the solvent" in the singular. In order to provide for the reversible dissolution and plating of an electroactive metal, the solvent advantageously should provide appreciable solubility by coordination of the constituent inorganic salts of the electroactive metal. In various embodiments, suitable solvents include ethers, organic carbonates, carbonate esters, and tertiary amines, and may also include lactones, ketones, glymes, nitriles, ionic liquids, aliphatic and aromatic hydrocarbon solvents and organic nitro solvents. Non-limiting examples of suitable solvents include 1-methyl-3-trifluoromethyl-2-pyrazolin-5-one (MTMP), Bis(2,2,2-trifluoroethyl) ether (BTFE), Tris(2,2,2-trifluoroethyl) phosphite (TTFP), Dimethyl methylphosphonate (DMMP), THF, 2-methyl THF, dimethoxyethane, diglyme, triglyme, tetraglyme, 1,2-diethoxyethane, diethylether, 3-(1,1,2,2-tetrafluoroethoxy)-1,1,2,2-tetrafluoropropane, proglyme, ethyl diglyme, butyl diglyme, ethylene carbonate, dimethyl carbonate, diethyl carbonate, ethyl methyl carbonate, propylene carbonate, 1,2-Butylene carbonate, bis(2,2,2-trifluoroethyl)carbonate, methyl 2,2,3,3-tetrafluoropropyl carbonate, dimethylsulfoxide, dimethylsulfite, sulfolane, ethyl methyl sulfone, acetonitrile, hexane, toluene, nitromethane, 1,3-dioxalane, 1,3-dioxane, 1,4-dioxane, trimethyl phosphate, triethyl phosphate, hexamethylphosphoramide (HMPA), 1-propyl-1-methylpyrrolidinium bis(trifluoromethylsulfonyl)imide (P13-TFSI), 1-propyl-1-methylpyrrolidinium diacetamide (P13-DCA), 1-propyl-1-methylpyrrolidinium bis(fluorosulfonyl)imide (P13-FSI), 1-butyl-1-methylpyrrolidinium bis(oxalate)borate (P14-BOB), 1-butyl-1-methylpyrrolidinium difluoro(oxalato)borate (P14-DFOB), ethyldimethylpropylammonium bis(trifluoromethylsulfonyl)imide ($N_{1123}$-TFSI), and 1-(methoxyethyl)-1-methylpiperidinium bis(trifluoromethylsulfonyl)imide (MOEMPP-TFSI).

A number of additives are appropriate for use in the electrolyte of the present invention. These additives may be used alone or in combination to generate the most beneficial electrolyte solutions. In various embodiments, the additives include pyrrolidones, sulfonimides, carbodimides, sulfonylfluorides, fluoroacetates, silanes, cyano-silanes, triflate, organo-borates, nitriles, or isocyanates. In preferred embodiments, suitable additives include 1-ethyl-2-pyrrolidone (NEP), N-fluorobenzenesulfonimide (FBSI), bis(alkyl)- or bis(aryl)carbodiimides, allyl trifluoroacetate, vinyltrimethylsilane, tetra(isocyanato)silane, carbon dioxide, LiBSB, LiOTf, perfluorobutanesulfonyl fluoride (PFBS-F), LiPFBS, lithium vinyltrifluoroborate, aryl nitriles (particularly any of a number of substituted benzonitriles), alkyl- or aryl-isocyanates, examples of which include ethyl-, pentyl-, dodecyl-, and 4-fluorophenyl-isocyanate.

According to one aspect, the invention features a rechargeable electrochemical cell having a non-aqueous fluid electrolyte solution, comprising: a negative electrode comprising lithium metal in part in direct physical contact with the non-aqueous fluid electrolyte; a positive electrode in direct physical contact with the non-aqueous fluid electrolyte; an electronically insulating separator configured to separate the negative electrode and the positive electrode; the non-aqueous fluid electrolyte comprising: at least one organic solvent; at least one electrolytically active, soluble, lithium (Li) salt other than $LiPF_6$ or $LiAsF_6$ or $LiClO_4$; and at least one additive from the following: pyrrolidones, sulfonimides, carbodimides, sulfonylfluorides, nitriles, isocyanates, fluoroacetates, silanes, triflate, halides, or organoborates.

In one embodiment, at least one electrolytically active lithium salt is selected from the group of salts consisting of lithium bis(perfluoroalkylsulfonyl)imide, lithium bis(fluorosulfonyl)imide, lithium bis(trifluoromethanesulfonyl)imide, lithium bis(perfluoroethylsulfonyl)imide, lithium dicyanamide, lithium tricyanomethide, lithium tetracyanoborate, lithium bis(oxalato)borate, lithium difluoro(oxalato)borate, lithium difluoro(malonato)borate, lithium tetrafluoroborate, lithium bis(benzenesulfonyl)imide, lithium triflate, lithium bis(perfluoropinacolato)borate, lithium bis(salicylato)borate, lithium perfluorobutanesulfonate, lithium thiocyanate, lithium triflinate, lithium nitrate.

In another preferred embodiment, at least one additive is selected from the group of chemicals consisting of bis (trimethylsilyl)carbodiimide, 1-ethyl-2-pyrrolidone, 1-phenylpyrrolidine, N-nitrosopyrrolidine, carbon dioxide, Disuccinimidyl carbonate, N-fluorobenzenesulfonimide, allyl trifluoroacetate, lithium trifluoroacetate, methyl difluoroacetate, ethyl difluoroacetate, Ethyl 4,4,4-trifluoro(aceto)acetate, Methyl 2,2-difluoro-2-(fluorosulfonyl)acetate, vinyltrimethylsilane, tetra(isocyanato)silane, lithium bis (salicylato)borate, lithium triflate, lithium fluoride, Lithium nonafluorobutanesulfonate "nonaflate", perfluoro-1-butanesulfonyl fluoride, lithium perfluorobutanesulfonate, lithium vinyltrifluoroborate, Lithium 1,1,2,2,3,3-Hexafluoropropane-1,3-disulfonimide, lithium halide, benzonitriles, N-fluorobenzenesulfonimide, 4-fluorobenzonitrile, 4-trifluoromethyl benzonitrile, benzonitrile, methyl Cyanoacetate, chlorosulfonyl isocyanate, aryl isocyanates, 4-methoxyphenyl isocyanate, 1,3-phenylene diisocyanate, 1,4-phenylene diisocyanate, 3,5-bis(trifluoromethyl)phenyl isocyanate, 2-trifluoromethoxyphenyl isocyanate, alkyl isocyanates, ethyl isocyanate, pentyl isocyanate, octyl isocyanate, dodecyl isocyanate, 4-fluorobenzyl isocyanate.

In yet another embodiment, an anode polarization between electrodeposition and electrodissolution is less than 500 mV at 25 degrees Celsius.

In still another embodiment, the cell Coulombic efficiency is greater than 99.35% at 25 degrees Celsius.

In a further embodiment, the electrolyte solution comprises one or more liquid-infused polymers or gels.

In yet a further embodiment, the negative electrode and the positive electrode are configured such that a capacity of the negative electrode is strictly less than a capacity of the positive electrode.

In an additional embodiment, a ratio of reversible capacity between the negative electrode and the positive electrode is such that Q(negative electrode)/Q(positive electrode)<0.9.

In one more embodiment, the rechargeable electrochemical cell is configured to charge to greater than or equal to 4.0 V.

In one more embodiment, the rechargeable electrochemical cell is configured to charge to greater than or equal to 4.3 V.

In still a further embodiment, the rechargeable electrochemical cell is configured to discharge to −2.5 V.

In one embodiment, the rechargeable electrochemical cell is configured to charge and discharge at ≤10 C-rate of rated capacity.

In another embodiment, the rechargeable electrochemical cell is configured to discharge and charge at temperatures in the range of −20° C. and 200° C.

In yet another embodiment, the rechargeable electrochemical cell is configured to provide at least 80% of initial capacity for greater than 30 charging and discharging cycles.

In still another embodiment, the rechargeable electrochemical cell is wherein the negative electrode is configured to provide >1000 mAh/cc.

In a further embodiment, the active cation is lithium.

In yet a further embodiment, an anode Coulombic efficiency is greater than 99.35% at 25 degrees Celsius.

In an additional embodiment, the non-aqueous electrolyte comprises a salt, or combination of salts in a concentration in the range of 0.5 M to saturated.

In one more embodiment, at least one of the negative electrode or positive electrode comprises one of a metal, an alloy, and an intermetallic compound.

In still a further embodiment, at least one of the negative electrode or positive electrode comprises a material configured to undergo a reaction selected from the group of reactions consisting of an insertion reaction, an alloying, an intercalation, a disproportionation, a conversion reaction, or a combination thereof.

In an additional preferred embodiment, the positive electrode comprises an electroactive material in a solid state, or a liquid state, but not in a gaseous state. In particular, the present invention is not directed to lithium-oxygen batteries.

In an additional embodiment, a pressure perpendicular to the interface of the positive and negative electrodes is greater than 0.06 MPa.

In one more embodiment, the rechargeable electrochemical cell further comprises at least one gate electrode having a gate electrode electrical terminal, the gate electrode in communication with the non-aqueous fluid electrolyte and permeable to at least one mobile species which is redox-active at at least one of the positive electrode or the negative electrode, the gate electrode situated between the positive electrode and the negative electrode.

In still a further embodiment, the rechargeable electrochemical cell comprises lithium metal which is configured to plate onto a negative electrode current collector during charging.

According to another aspect, the invention relates to a rechargeable electrochemical cell comprising: a negative electrode comprising in direct physical contact with the non-aqueous fluid electrolyte; a positive electrode in direct physical contact with the non-aqueous fluid electrolyte; an electronically insulating separator configured to separate the negative electrode and the positive electrode; and a non-aqueous electrolyte wherein lithium ions are the primary charge carrier comprising: at least one organic solvent; at least one salt comprising at least two of the following elements: boron, fluorine, carbon, nitrogen, or oxygen; and at least one additive from the following: pyrrolidones, sulfonimides, carbodimides, sulfonylfluorides, nitriles, isocyanates, fluoroacetates, silanes, triflate, halides, or organoborates.

In one embodiment, at least one electrolytically active lithium salt is selected from the group of salts consisting of lithium bis(perfluoroalkylsulfonyl)imide, lithium bis(fluorosulfonyl)imide, lithium bis(trifluoromethanesulfonyl)imide, lithium bis(perfluoroethylsulfonyl)imide, lithium dicyanamide, lithium tricyanomethide, lithium tetracyanoborate, lithium bis(oxalato)borate, lithium difluoro(oxalato)borate, lithium difluoro(malonato)borate, lithium tetrafluoroborate, lithium bis(benzenesulfonyl)imide, lithium triflate, lithium bis(perfluoropinacolato)borate, lithium bis(salicylato)borate, lithium perfluorobutanesulfonate, lithium thiocyanate, lithium triflinate, and lithium nitrate.

In another preferred embodiment, at least one additive is selected from the group of chemicals consisting of Bis (trimethylsilyl)carbodiimide, 1-ethyl-2-pyrrolidone, 1-phenylpyrrolidine, N-nitrosopyrrolidine, carbon dioxide, Disuccinimidyl carbonate, N-fluorobenzenesulfonimide, allyl trifluoroacetate, lithium trifluoroacetate, methyl difluoroacetate, ethyl difluoroacetate, Ethyl 4,4,4-trifluoro(aceto)acetate, Methyl 2,2-difluoro-2-(fluorosulfonyl)acetate, vinyltrimethylsilane, tetra(isocyanato)silane, lithium bis(salicylato)borate, lithium triflate, lithium fluoride, Lithium nonafluorobutanesulfonate "nonaflate", perfluoro-1-butanesulfonyl fluoride, lithium perfluorobutanesulfonate, lithium vinyltrifluoroborate, Lithium 1,1,2,2,3,3-Hexafluoropropane-1,3-disulfonimide, lithium halide, benzonitriles, N-fluorobenzenesulfonimide, 4-fluorobenzonitrile, 4-trifluoromethyl benzonitrile, benzonitrile, methyl Cyanoacetate, chlorosulfonyl isocyanate, aryl isocyanates, 4-methoxyphenyl isocyanate, 1,3-phenylene diisocyanate, 1,4-phenylene diisocyanate, 3,5-bis(trifluoromethyl)phenyl isocyanate, 2-trifluoromethoxyphenyl isocyanate, alkyl isocyanates, ethyl isocyanate, pentyl isocyanate, octyl isocyanate, dodecyl isocyanate, 4-fluorobenzyl isocyanate.

In yet another embodiment, an anode polarization between electrodeposition and electrodissolution is less than 500 mV at 25 degrees Celsius.

In still another embodiment, the cell Coulombic efficiency is greater than 99.35% at 25 degrees Celsius.

In a further embodiment, the electrolyte solution comprises one or more liquid-infused polymers or gels.

In yet a further embodiment, the negative electrode and the positive electrode are configured such that a capacity of the negative electrode is strictly less than a capacity of the positive electrode.

In an additional embodiment, a ratio of reversible capacity between the negative electrode and the positive electrode is such that Q(negative electrode)/Q(positive electrode)<0.9. Applicant hereby incorporates by reference in their entirety the disclosures of co-pending US Patent Application Publication Number 2016-0172660 A1 published Jun. 16, 2016, and US Patent Application Publication Number 2016-0172661 A1 published Jun. 16, 2016, corresponding to U.S. Ser. No. 14/966,100 and U.S. Ser. No. 14/966,392, respectively.

In one more embodiment, the rechargeable electrochemical cell is configured to charge to greater than or equal to 4.0 V.

In one more embodiment, the rechargeable electrochemical cell is configured to charge to greater than or equal to 4.3 V.

In still a further embodiment, the rechargeable electrochemical cell is configured to discharge to −2.5 V.

In one embodiment, the rechargeable electrochemical cell is configured to charge and discharge at ≤10 C-rate of rated capacity.

In another embodiment, the rechargeable electrochemical cell is configured to discharge and charge at temperatures in the range of −20° C. and 200° C.

In yet another embodiment, the rechargeable electrochemical cell is configured to provide at least 80% of initial capacity for greater than 30 charging and discharging cycles.

In still another embodiment, the negative electrode is configured to provide >1000 mAh/cc.

In a further embodiment, the active cation is lithium.

In yet a further embodiment, an anode Coulombic efficiency is greater than 99.35% at 25 degrees Celsius.

In an additional embodiment, the non-aqueous electrolyte comprises a salt, or combination of salts in a concentration in the range of 0.5 M to saturated.

In one more embodiment, at least one of the negative electrode or positive electrode comprises one of a metal, an alloy, and an intermetallic compound.

In still a further embodiment, at least one of the negative electrode or positive electrode comprises a material configured to undergo a reaction selected from the group of reactions consisting of an insertion reaction, an alloying, an intercalation, a disproportionation, a conversion reaction, or a combination thereof.

In an additional embodiment, a pressure perpendicular to the interface of the positive and negative electrodes is greater than 0.06 MPa.

In one more embodiment, the rechargeable electrochemical cell further comprises at least one gate electrode having a gate electrode electrical terminal, the gate electrode in communication with the non-aqueous fluid electrolyte and permeable to at least one mobile species which is redox-active at at least one of the positive electrode or the negative electrode, the gate electrode situated between the positive electrode and the negative electrode.

In still a further embodiment, the rechargeable electrochemical cell comprises lithium metal which is configured to plate onto a negative electrode current collector during charging.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
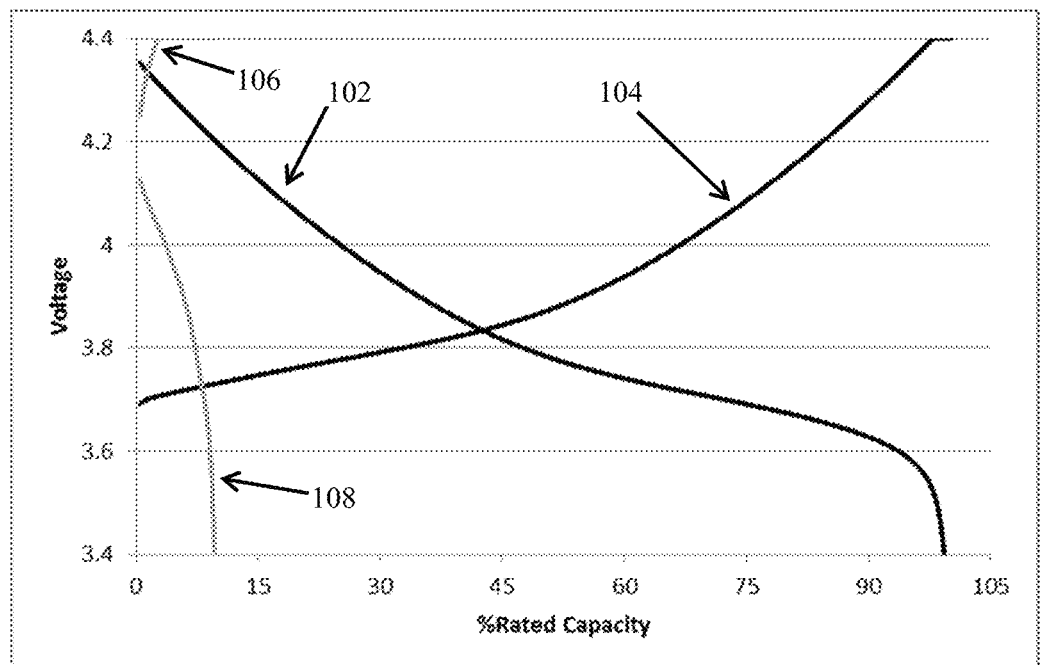
FIG. 1 depicts charge (curve 104) and discharge (curve 102) voltage vs. percent of rated capacity for cycle 1 (black) and charge (curve 106) and discharge (curve 108) voltage vs. percent of rated capacity for cycle 60 (grey) of cells containing lithium transition metal oxide cathode, a lithium metal anode, and an 0.85 M lithium bis(oxalato)borate in EC:DMC 1:2 (v/v) electrolyte.

The embodiments herein provide new electrolyte solvents or additives that enable reversible deposition and dissolution of lithium metal for many charge-discharge cycles. In some of the embodiments presented herein, the additive containing non-aqueous electrolytes also provide benefit in terms of ability to maintain cycle life higher rates of charge and discharge, or in terms of reduced impedance, or reduced volume of gas evolved due to parasitic reactions. More specifically, the embodiments herein describe chemical compounds, which, when used either as bulk electrolyte solvents or co-solvents, or as additives in low concentrations, can form passivation layers on either the anode or cathode surface or both. These passivation layers offer protection over a wide range of voltages and temperatures while remaining sufficiently conductive to promote fast kinetics of the cell chemistry. Electrolyte solutions are formulated from the salts, solvents, and additives mentioned herein. The lithium metal batteries that can be fabricated using the aforementioned electrolytes are commercially viable.

We now describe example solvent systems that are expected to be suitable for secondary lithium metal battery electrolytes. These solvent systems contain one or more chemicals from the following classes: ethers, fluoro-ethers, organic carbonates, carbonate esters, sulfoxides, sulfites, sulfones, nitriles, alkanes, dioxanes, phosphates, aliphatic and aromatic hydrocarbon solvents or ionic liquids.

Non-limiting examples of the electrolyte solvent or solvents include the following: THF, 2-methyl THF, dimethoxyethane, diglyme, triglyme, tetraglyme, 1,2-diethoxyethane, diethylether, 3-(1,1,2,2-tetrafluoroethoxy)-1,1,2,2-tetrafluoropropane, proglyme, ethyl diglyme, butyl diglyme, ethyl acetate (EA), ethylene carbonate (EC), 1,2-Butylene carbonate (BC), dimethyl carbonate (DMC), diethyl carbonate (DEC), ethyl methyl carbonate (EMC), propylene carbonate (PC), fluoro-ethylene carbonate (FEC), bis(2,2,2-trifluoroethyl)carbonate, methyl 2,2,3,3-tetrafluoropropyl carbonate, dimethylsulfoxide, dimethylsulfite, sulfolane, ethyl methyl sulfone, acetonitrile, hexane, toluene, nitromethane, 1,3-dioxalane, 1,3-dioxane, 1,4-dioxane, trimethyl phosphate, triethyl phosphate, hexamethylphosphoramide (HMPA), 1-propyl-1-methylpyrrolidinium bis(trifluoromethylsulfonyl)imide (P13-TFSI), 1-propyl-1-methylpyrrolidinium diacetamide (P13-DCA), 1-propyl-1-methylpyrrolidinium bis(fluorosulfonyl)imide (P13-FSI), 1-butyl-1-methylpyrrolidinium bis(oxalate)borate (P14-BOB), 1-butyl-1-methylpyrrolidinium difluoro(oxalato)borate (P14-DFOB), ethyldimethylpropylammonium bis(trifluoromethylsulfonyl)imide ($N_{1123}$-TFSI), and 1-(methoxyethyl)-1-methylpiperidinium bis(trifluoromethylsulfonyl)imide (MOEMPP-TFSI).

In a more preferred embodiment, at least one component of the electrolyte solvent is a cyclic carbonate.

In another preferred embodiment, at least one component of the electrolyte solvent is ethylene carbonate.

In yet another preferred embodiment, ethylene carbonate comprises greater than or equal to 33% by volume of the electrolyte solvent mixture.

At least one other component of the electrolyte solvent mixture is chosen from the remaining solvents listed herein.

In a preferred embodiment, the second component is either an acyclic carbonate or ether molecule.

In yet another preferred embodiment, the second component is DMC, EMC, DEC, PC, bis(2,2,2-trifluoroethyl) carbonate, methyl 2,2,3,3-tetrafluoropropyl carbonate, ethyl diglyme or 3-(1,1,2,2-tetrafluoroethoxy)-1,1,2,2-tetrafluoropropane, comprising less than or equal to 67% by volume of the electrolyte solvent mixture.

We now provide example salts that are expected to be suitable for secondary lithium metal battery electrolytes.

In other preferred embodiments the example fluid electrolytes that are expected to be suitable for secondary lithium battery systems contain one or more lithium salts comprising at least two of the following elements boron, fluorine, carbon, nitrogen, or oxygen. In particular, materials contemplated for use in the electrolytes of the invention can be described by the general formula LiA, where A is a polyatomic monovalent negative ion. Non-limiting examples of polyatomic monovalent anions, A, that are believed to be useful in practicing the invention include, but are not limited to, those described in Table I, and mixtures thereof.

TABLE I

| Chemical name | Acronym | Formula |
|---|---|---|
| bis(perfluoroalkylsulfonyl)imides | | $N((C_xF_{2x+1})_xSO_2)_2^{-1}$ |
| bis(fluorosulfonyl)imide | FSI (x = 0) | $N(SO_2F)_2^{-1}$ |
| bis(trifluoromethanesulfonyl)imide | TFSI (x = 1) | $N(CF_3SO_2)_2^{-1}$ |
| bis(perfluoroethylsulfonyl)imide | BETI (x = 2) | $N(C_2F_5SO_2)_2^{-1}$ |
| Dicyanamide | DCA | $N(CN)_2^{-1}$ |
| Tricyanomethide | TCM | $C(CN)_3^{-1}$ |
| tetracyanoborate | TCB | $B(CN)_4^{-1}$ |
| difluoro(malonato)borate | DFMB | $BF_2(C_3H_2O_4)^{-1}$ |
| tetrafluoroborate | | $BF_4^{-1}$ |
| bis(benzenesulfonyl)imide | BBI | $N(C_6H_5SO_2)_2^{-1}$ |
| triflate | OTf | $CF_3SO_3^{-1}$ |
| bis(oxalato)borate | BOB | $B(C_2O_4)_2^{-1}$ |
| difluoro(oxalato)borate | DFOB | $BF_2(C_2O_4)^{-1}$ |
| bis(perfluoropinacolato)borate | | $B(C_6F_{12}O_2)_2^{-1}$ |
| bis(salicylato)borate | BSB | $B(C_7H_4O_3)_2^{-1}$ |
| perfluorobutanesulfonate | PFBS | $(C_4F_9SO_3)^{-1}$ |
| thiocyanate | | $SCN^{-1}$ |
| triflinate | | $CF_3SO_2^{-1}$ |
| nitrate | | $NO_3^{-1}$ |

In some preferred embodiments the example fluid electrolytes that are expected to be suitable for secondary lithium battery systems contain N/P ratio <0.9.

Additives are included in the electrolyte either unaccompanied or in combination and are selected from the following groups: pyrrolidones, sulfonimides, carbodiimides, acetates, vinyl-substituted compounds, sulfonyl fluorides, aryl nitriles, aryl- or alkyl-isocyanates, carbon dioxide, or lithium salts.

It is expected that these additives will be beneficial to Li-ion cells in which a significant amount of Li metal is plated.

In a preferred embodiment, individual additives or combinations thereof are chosen from those listed in Table II and comprise between 0 and 10 wt % of the total electrolyte mass.

TABLE II

| Additive Name | Acronym | Formula |
|---|---|---|
| 1-ethyl-2-pyrrolidone | NEP | $C_6H_{11}NO$ |
| Carbon Dioxide | | $CO_2$ |
| N-fluorobenzenesulfonimide | FBSI | $(C_6H_5SO_2)_2NF$ |
| Allyl trifluoroacetate | | $CF_3CO_2CH_2CH=CH_2$ |

TABLE II-continued

| Additive Name | Acronym | Formula |
|---|---|---|
| Vinyltrimethylsilane | | $(CH_3)_3SiCH=CH_2$ |
| Tetra(isocyanato)silane | | $Si(NCO)_4$ |
| Lithium bis(salicylato)borate | LiBSB | $Li[B(C_7H_4O_3)_2]$ |
| Lithium triflate | LiOTf | $Li[CF_3SO_3]$ |
| Perfluorobutanesulfonyl Floride | PFBS-F | $C_4F_9SO_3F$ |
| Lithium perfluorobutanesulfonate | LiPFBS | $Li[C_4F_9SO_3]$ |
| Lithium vinyltrifluoroborate | | $Li[F_3BCH=CH_2]$ |
| Lithium halide | LiX | X = F, Cl, Br, I |
| Benzonitriles | R = H, F, Cl, $CH_3$, $CH=CH_2$, $CF_3$, NCO, CN, $OCH_3$ | $C_6R_5C\equiv N$ |
| 4-fluorobenzonitrile | 4*R = H, R' = F | $FC_6H_4C\equiv N$ |
| 4-trifluoromethyl benzonitrile | 4*R = H, R' = $CF_3$ | $(F_3C)C_6H_4C\equiv N$ |
| Benzonitrile | R = H | $C_6H_5C\equiv N$ |
| Aryl Isocyanates | R = H, F, Cl, $CH_3$, $CH=CH_2$, $CF_3$, NCO, CN, $OCH_3$ | $C_6R_5N=C=O$ |
| 4-methoxyphenyl isocyanate | 4*R = H, R' = $OCH_3$ | $(CH_3O)C_6H_4N=C=O$ |
| 1,3-phenylene diisocyanate | 4*R = H, R' = NCO | $C_6H_4(N=C=O)_2$ |
| 1,4-phenylene diisocyanate | 4*R = H, R' = NCO | $C_6H_4(N=C=O)_2$ |
| 3,5-bis(trifluoromethyl)phenyl isocyanate | 3*R = H, 2*R' = $CF_3$ | $(F_3C)_2C_6H_3N=C=O$ |
| 2-trifluoromethoxyphenyl isocyanate | 4*R = H, R' = $OCF_3$ | $(F_3CO)C_6H_4N=C=O$ |
| Alkyl isocyanates | n = 1-12 | $C_nH_{(2n+1)}N=C=O$ |
| Ethyl isocyanate | n = 2 | $C_2H_5N=C=O$ |
| Pentyl isocyanate | n = 5 | $C_5H_{11}N=C=O$ |
| Octyl isocyanate | n = 8 | $C_8H_{17}N=C=O$ |
| Dodecyl isocyanate | n = 12 | $C_{12}H_{25}N=C=O$ |
| 4-fluorobenzyl isocyanate | | $FC_6H_4(CH_2N=C=O)$ |
| bis(trimethylsilyl)carbodiimide | BTSC | $(CH_3)_3SiN=C=NSi(CH_3)_3$ |
| 1-phenylpyrrolidine | NPD | $C_{10}H_{13}N$ |
| N,N'-Disuccinimidyl carbonate | DSIC | $C_9H_8N_2O_7$ |
| N-nitrosopyrrolidine | NSP | $C_4H_8N_2O$ |
| lithium trifluoroacetate | LiTFA | $LiCO_2CF_3$ |
| methyl difluoroacetate | MDFA | $F_2CHCO_2CH_3$ |
| ethyl difluoroacetate | Et-DFA | $F_2CHCO_2C_2H_5$ |
| Ethyl 4,4,4-trifluoro(aceto)acetate | Et-TFAA | $CF_3COCH_2CO_2C_2H_5$ |
| Methyl 2,2-difluoro-2-(fluorosulfonyl)acetate | MDFSA | $FSO_2CF_2CO_2CH_3$ |
| Lithium nonafluorobutanesulfonate | LiPFBS | $C_4F_9LiO_3S$ |
| Lithium 1,1,2,2,3,3-Hexafluoropropane-1,3-disulfonimide | LiHFPDS | $C_3F_6LiNO_4S_2$ |
| N-fluorobenzenesulfonimide | NFSI | $(C_6H_5SO_2)_2NF$ |
| methyl Cyanoacetate | MeCNA | $NCCH_2COOCH_3$ |
| chlorosulfonyl isocyanate | ClS-NCO | $ClSO_2NCO$ |

Example 1

We describe a general procedure for the preparation of novel electrolyte solutions suitable for commercially viable lithium metal batteries, the components of which are selected from embodiments herein. Both the concentration of the lithium salts and the relative ratios between the solvents or additives can be varied according to individual needs. The electrolyte solution is prepared in an environment that is moisture- and oxygen-free by dissolving one lithium salt or a combination of lithium salts selected from Table I in a mixture that is one part EC and two parts DMC by volume. The total concentration of lithium cations should occur in the range of 0.25 M to 5 M. A single additive or combination of additives is selected from Table II and dissolved in the electrolyte solution between 0 and 10 wt %. Dissolution occurs within 1-2 hours and the electrolyte may or may not be filtered prior to use.

Intercalation cathodes used in conjunction with the electrolyte according to the present invention preferably include transition metal oxides, transition metal oxo-anions, chalcogenides, and halogenides and combinations thereof. Non-limiting examples of positive electrode active material for the rechargeable Li metal anode battery include Chevrel phase $Mo_6S_8$, $MnO_2$, CuS, $Cu_2S$, $Ag_2S$, $CrS_2$, $VOPO_4$, layered structure compounds such as $TiS_2$, $V_2O_5$, $MgVO_3$, $MoS_2$, $MgV_2O_5$, $MoO_3$, Spinel structured compounds such as $CuCr_2S_4$, $MgCr_2S_4$, $MgMn_2O_4$, $MgNiMnO_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)_2$, Tavorite structured compounds such as $Mg_{0.5}VPO_4F$, pyrophosphates such as $TiP_2O_7$ and $VP_2O_7$, and fluorides such as $MgMnF_4$ and $FeF_3$. Non-limiting examples of positive electrode active materials for the rechargeable Li metal anode battery include lithium transition metal oxides comprised of one or more transition metals and one or more redox active transition metals such as Lithium Cobalt Oxide, Lithium Nickel Manganese Cobalt Oxide, and Lithium Nickel Cobalt Aluminum Oxide compositions. Non-limiting examples of positive electrode active materials for the Li battery include Lithium metal phosphates and tavorites such as $LiFePO_4$, Lithium metal oxide spinels $LiMn_2O_4$, and Li NASICON's $Li_3V_2(PO_4)_3$. The focus of this invention excludes the use of air, or oxygen cathodes due to chemical incompatibility of the non-aqueous electrolyte solutions disclosed herein as well as the inherent voltage, and hence energy, limitation of such systems. In particular, the present invention is not directed to lithium-oxygen batteries.

In some embodiments, the positive electrode layer further comprises an electronically conductive additive. Non-limiting examples of electronically conductive additives include carbon black, Super P®, C-NERGY Super C65, Ensaco® black, Ketjenblack®, acetylene black, synthetic graphite such as Timrex® SFG-6, Timrex® SFG-15, Timrex® SFG-44, Timrex® KS-6, Timrex® KS-15, Timrex® KS-44, natural flake graphite, graphene, carbon nanotubes, fullerenes, hard carbon, or mesocarbon microbeads.

In some embodiments, the positive electrode layer further comprises a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex® 2801, Kynar® Powerflex LBG, and Kynar® HSV 900, or Teflon®.

Negative electrodes used in conjunction with the present invention comprise a negative electrode active material that can accept Li-ions into the metallic form. Non-limiting examples of negative electrode active material for the rechargeable Li metal anode battery include Li, Li alloys such as Si, Sn, Bi, Al, Li4Ti5O12, hard carbon, Cu, graphitic carbon, amorphous carbon.

In some embodiments, the negative electrode layer further comprises an electronically conductive additive. Non-limiting examples of electronically conductive additives include carbon black, Super P®, C-NERGY Super C65, Ensaco® black, Ketjenblack®, acetylene black, synthetic graphite such as Timrex® SFG-6, Timrex® SFG-15, Timrex® SFG-44, Timrex® KS-6, Timrex® KS-15, Timrex® KS-44, natural flake graphite, carbon nanotubes, fullerenes, hard carbon, or mesocarbon microbeads.

In some embodiments, the negative electrode layer further comprises a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex® 2801, Kynar® Powerflex LBG, and Kynar® HSV 900, or Teflon®.

In some embodiments, the positive and negative electrodes are separated by a porous separator comprising a polyolefin, ceramic, or composite thereof, which is ionically conductive, yet electronically resistive, Non-limiting examples of materials comprising separators include polypropylene (PP), polyethylene (PE), aluminum oxide ($Al_2O_3$), and poly-vinylidene fluoride (PVdF).

In some embodiments, the rechargeable Li metal anode battery used in conjunction with the electrolyte described herein comprises a positive electrode current collector comprising carbonaceous material, or a current collector comprising a metal substrate coated with an over-layer to prevent corrosion in the electrolyte. In some embodiments, the rechargeable Li metal battery described herein comprises a negative electrode current collector comprising any material capable of sufficiently conducting electrons. In other embodiments, the rechargeable Li metal battery described herein comprises positive and negative electrode current collectors comprising any material capable of sufficiently conducting electrons.

In some embodiments, the rechargeable Li metal battery disclosed herein is a button or coin cell battery comprising a stack of negative electrode, porous polyolefin or glass fiber separator, and positive electrode disks sit in a can base onto which the can lid is crimped. In other embodiments, the rechargeable Li metal battery used in conjunction with the electrolyte disclosed herein is a stacked cell battery. In other embodiments, the rechargeable Li metal battery disclosed herein is a prismatic, or pouch, cell comprising one or more stacks of negative electrode, porous polyolefin or glass fiber separator, and positive electrode sandwiched between current collectors wherein one or both current collectors comprise a metal, carbonaceous materials, or a metal substrate coated with an over-layer to prevent corrosion in the electrolyte. The stack(s) are folded within a polymer coated aluminum foil pouch, vacuum and heat dried, filled with electrolyte, and vacuum and heat sealed. In other embodiments, the rechargeable Li metal battery disclosed herein is a prismatic, or pouch, bi-cell comprising one or more stacks of a positive electrode, which is coated with active material on both sides and wrapped in porous polypropylene or glass fiber separator, and a negative electrode folded around the positive electrode wherein one or both current collectors a metal, carbonaceous materials, or a metal substrate coated with an over-layer to prevent corrosion in the electrolyte. The stack(s) are folded within a polymer coated aluminum foil pouch, dried under heat and/or vacuum, filled with electrolyte, and vacuum and heat sealed. In some embodiments of the prismatic or pouch cells used in conjunction with the electrolyte described herein, an additional tab composed of a metal foil or carbonaceous material of the same kind as current collectors described herein, is affixed to the current collector by laser, resistance, or ultrasonic welding, adhesive, or mechanical contact, in order to connect the electrodes to the device outside the packaging.

In other embodiments, the rechargeable Li metal battery used in conjunction with the electrolyte disclosed herein is a wound or cylindrical cell comprising wound layers of one or more stacks of a positive electrode which is coated with active material on one or both sides, sandwiched between layers of porous polypropylene or glass fiber separator, and a negative electrode wherein one or both current collectors a metal, carbonaceous materials, or a metal substrate coated with an over-layer to prevent corrosion in the electrolyte. The stack(s) are wound into cylindrical roll, inserted into the can, dried under heat and/or vacuum, filled with electrolyte, and vacuum and crimped, or welded shut. In some embodiments of the cylindrical cells described herein, an additional tab composed of a metal foil or conducting material of the same kind as current collectors described herein, is affixed to the current collector by laser, resistance, or ultrasonic welding, adhesive, or mechanical contact, in order to connect the electrodes to an external circuit outside the packaging.

In other embodiments, the rechargeable Li metal battery comprises a positive electrode terminal, a negative electrode terminal, and at least one additional (i.e., $3^{rd}$) terminal capable of acting as a simple reference electrode for monitoring resistance, passive voltage, temperature, pressure, an active gate electrode for controlling voltage, current, resistance, or a lithium reservoir electrode for replacing depleted lithium.

Example 2

Figure 2:
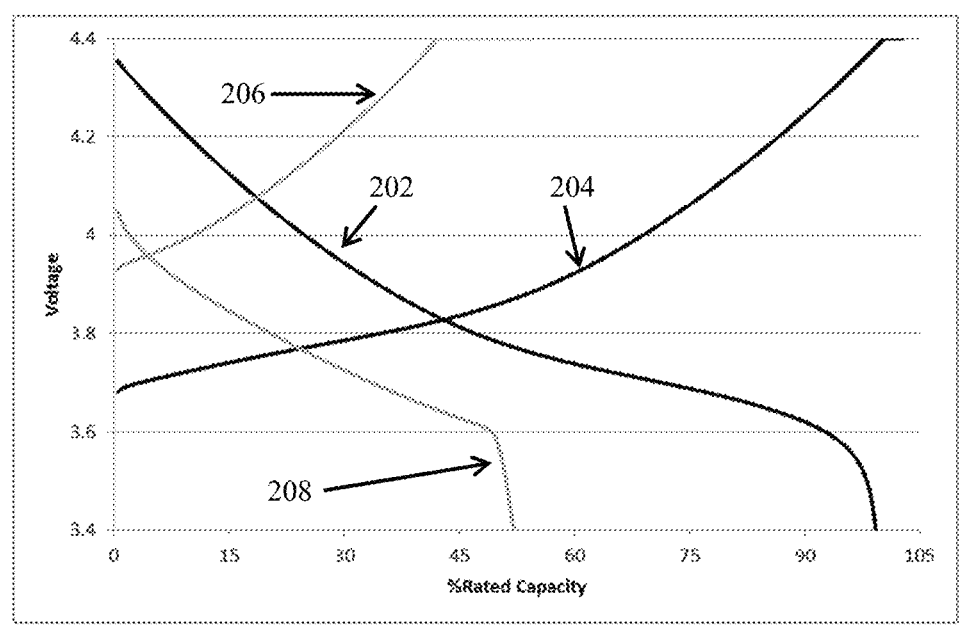
FIG. 2 depicts charge (curve 204) and discharge (curve 202) voltage vs. percent of rated capacity for cycle 1 (black) and charge (curve 206) and discharge (curve 208) voltage vs. percent of rated capacity for cycle 60 (grey) of cells containing lithium transition metal oxide cathode, a lithium metal anode, and an 0.85 M lithium bis(oxalato)borate+with 1 wt % dodecyl isocyanate additive in EC:DMC 1:2 (v/v) electrolyte.

FIG. 1 depicts voltage vs. percent of rated capacity for cycle 1 (black) and cycle 60 (grey) of cells containing lithium transition metal oxide cathode, a lithium metal anode, and an 0.85 M lithium bis(oxalato)borate in EC:DMC 1:2 (v/v) electrolyte. This is a zero excess lithium cell (i.e., N/P<1, all the lithium in the as built cell resides in the cathode.) The cell cycled at room temperature utilizing constant current discharge at one C-rate to 100% depth of discharge. It is apparent from the figure that the capacity retention at cycle 60 is only about 10% of the value achieved upon the initial discharge. FIG. 2 depicts voltage vs. percent of rated capacity for a comparative cell containing electrolyte additive among those disclosed herein. Cycle 1 (black) and cycle 60 (grey) of cells containing lithium transition metal oxide cathode, a lithium metal anode, and an 0.85 M lithium bis(oxalato)borate with an additive comprising 1 wt % dodecyl isocyanate dissolved in EC:DMC 1:2 (v/v) electrolyte. This is a zero excess lithium cell (i.e., N/P<1, all the lithium in the as built cell resides in the cathode.) The cell cycled at room temperature utilizing constant current discharge at one C-rate to 100% depth of discharge. It is apparent from the figure that the capacity retention at cycle 60 is about 50% of the value achieved upon discharge 1. The modification of the electrolyte through the addition of the 1 wt % dodecyl isocyanate results in four-fold increase in capacity retention through 60 cycles. Without being bound by any particular modes of operation it is thought that the addition of electrolyte additives to a rechargeable lithium metal cell comprising a lithium intercalation cathode, lithium anode, and separator electronically isolating the electrodes from one another, can improve the character of the cell performance by at least one of the following means: enhancing the mobility of lithium ions, enhancing the kinetics of lithium ion de-solvation, so as mitigate parasitic reduction of other electrolyte components, and/or be consumed at either or both electrode-electrolyte interfaces enhancing the stability of the interface while facilitating transport of lithium ions to and from the surface.

Example 3

Figure 3:
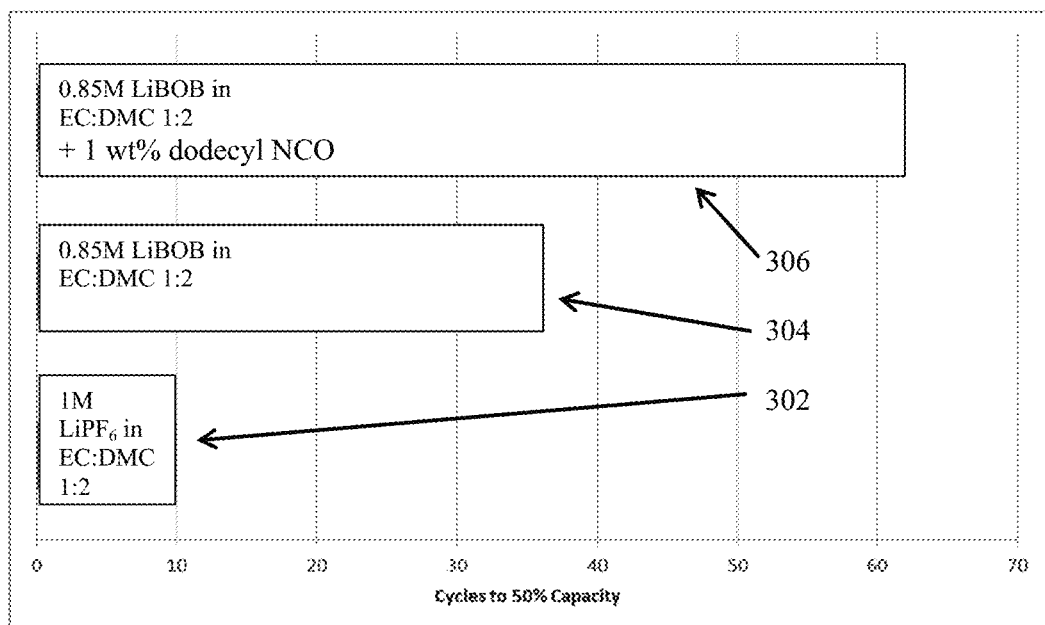
FIG. 3 shows the number of charge-discharge cycles to 50% rated capacity for 1 M $LiPF_6$ in EC:DMC 1:2 (v/v) (bar 302) as compared to 0.85 M LiBOB in EC:DMC 1:2 (v/v) (bar 304), and 0.85 M LiBOB+1 wt % dodecyl isocyanate in EC:DMC 1:2 (v/v) (bar 306) under the same cycling conditions in cells containing a lithium transition metal oxide cathode and a lithium metal anode.

Three cells comprised of a lithium transition metal oxide cathode, a lithium metal anode, an electrolyte and an porous, electronically resistive separator were cycled at room temperature utilizing constant current discharge at one C-rate to 100% depth of discharge. FIG. 3 depicts the number of charge-discharge cycles to 50% rated capacity for each of the three cells. The electrolyte in one cell comprises 1 M $LiPF_6$ in EC:DMC 1:2 (v/v) while the electrolyte in the second cell comprises 0.85 M LiBOB in EC:DMC 1:2 (v/v), and the third cell comprises 0.85 M LiBOB and an additive 1 wt % dodecyl isocyanate in EC:DMC 1:2 (v/v). The 1M $LiPF_6$ in EC:DMC 1:2 (v/v) requires only 10 cycles to fade down to 50% capacity while the electrolyte comprised of 0.85 M LiBOB in EC:DMC 1:2 (v/v) enables 50% capacity retention at cycle 36, and additive containing electrolyte, namely 0.85 M LiBOB and an additive 1 wt % dodecyl isocyanate in EC:DMC 1:2 (v/v) reaches the 50% capacity retention mark at 62 cycles. It is clear from the figure that the cells comprising electrolytes that contain one or more lithium salts comprising at least two of the following elements boron, fluorine, carbon, nitrogen, or oxygen suffer significantly less capacity fade that the cell with an electrolyte comprised of $LiPF_6$ lithium salt. Furthermore it is clear from FIG. 3 that the electrolyte comprised of an additive disclosed herein, 1 wt % dodecyl isocyanate, and one or more lithium salts comprising at least two of the following elements boron, fluorine, carbon, nitrogen, or oxygen provides surprisingly high cycle life in a zero excess rechargeable lithium cell.

Example 4

Similar to Example 3, 250 mAh cells comprised of a lithium transition metal oxide cathode, a lithium metal anode, a non-aqueous fluid electrolyte from Table III and an porous, electronically resistive separator were repeatedly cycled at room temperature utilizing constant current discharge at one C-rate to 100% depth of discharge and a charge rate of 0.5 C-rate to 100% depth of charge. The percent increase in cycle life at 70% capacity retention relative to an additive free non-aqueous electrolyte solution comprising $LiBF_2(C_2O_4)$ dissolved in carbonate solvents cycled with the same components and cycling regime is presented in TABLE III. For test group Al about 3% increase in the number of cycles to achieve 70% capacity retention is shown, For test group B1 and C1, there is about 2% and 1% increase in the number of cycles to achieve 70% capacity retention relative to the additive free non-aqueous electrolyte composition.

TABLE III

| Test Group | Additive(s) | Additive wt % | Salt(s) | Solvent(s) | % Increase |
|---|---|---|---|---|---|
| A1 | $ClSO_2NCO$ | 1 | $LiBF_2(C_2O_4)$ | ethylene carbonate, dimethyl carbonate | 3 |
| B1 | $LiCO_2CF_3$ | 1 | $LiNO_3$, $LiBF_2(C_2O_4)$ | ethylene carbonate, dimethyl carbonate | 2 |
| C1 | $LiCO_2CF_3$ | 2 | $LiBF_2(C_2O_4)$ | 1-methyl-3-trifluoromethyl-2-pyrazolin-5-one, Bis(2,2,2-trifluoroethyl) ether, ethylene carbonate, dimethyl carbonate | 1 |

Example 5

A variety of non-aqueous electrolytes comprising additives and formulations disclosed herein were prepared as shown in TABLE IV and added to "LiPo" style cells comprised of a lithium cobalt oxide cathode at 15 mg/cm2 aerial loading (250 mAh cell overall), a lithium metal anode as plated upon Cu-based current collector, and an porous, electronically resistive separator. The cells were formed at low rate, then cycled aggressively on a 3 hour total time cycle (about 2 hours to charge, and 1 hour to discharge). This was conducted at temperature of 28 degrees Celcius and 100% depth-of-discharge in order to elucidate improvements in Coulombic efficiency. TABLE IV depicts the results for the Coulombic efficiency as measure in the $5^{th}$ cycle. In addition, the standard deviation of this value is presented for a test group of N=5. In all cases, the additive containing formulations provide for at least 96% Coulombic efficiency, and in the majority of cases the $5^{th}$ cycle Coulobic efficiency increases to at least 98%. For example, the class of fluoroacetates typically provide for at least about 98% Coulombic efficiency (e.g., MDFSA, LiTFA, MDFA). Similarly the chlorosulfonyl isocyanate provides for 98.21% efficiency, and NSP provides for greater than 97% efficiency during aggressive cycling.

TABLE IV

| TEST GROUP | Additive | Additive wt % or mM | Salt(s) | Solvent(s) | 5th Cycle Coulombic Efficiency Percent (%) | 5th Cycle Coulombic Efficiency Standard Dev. |
|---|---|---|---|---|---|---|
| A2 | Chlorosulfonyl isocyanate (CIS-NCO) | 1.00% | LiDFOB | EC, DMC | 98.21 | 0.71 |
| B2 | lithium trifluoroacetate (LiTFA) | 1.00% | LiNO3, LiDFOB | EC, DMC | 98.42 | 0.17 |
| C2 | lithium trifluoroacetate (LiTFA) | 2.00% | | MTMP, BTFE, EC, DMC | 98.74 | 0.61 |
| A3 | lithium trifluoroacetate (LiTFA) | 2.00% | LiDFOB | EC, DMC | 98.13 | 0.52 |
| B3 | N-nitrosopyrrolidine (NSP) | 0.25% | | EC, DMC | 97.26 | 0.75 |
| C3 | Perfluoro-1-butanesulfonyl fluoride (PFBS-F) | 0.25% | | EC, DMC | 97.90 | 0.65 |
| A4 | Lithium nonafluorobutanesulfonate "nonaflate" (LiPFBS) | 5 mM | | EC, DMC | 97.38 | 0.78 |
| B4 | lithium trifluoroacetate (LiTFA) | 1.00% | LiDFOB | BTFE, TTFP, EC, DMC | 98.66 | 0.41 |
| C4 | Lithium trifluoroacetate (LiTFA) | 2.00% | LiDFOB | EC, DMC | 97.82 | 0.86 |
| A5 | Lithium trifluoroacetate (LiTFA) | 2.00% | LiDFOB | DMMP, EC, DMC | 98.11 | 0.83 |
| B5 | 1-phenylpyrrolidine (PPD) | 0.25% | LiDFOB | EC, DMC | 97.11 | 1.09 |
| C5 | Lithium 1,1,2,2,3,3-Hexafluoropropane-1,3-disulfonimide (LiHFPDS) | 5 mM | LiDFOB | EC, DMC | 98.58 | 0.95 |
| A6 | Allyl Trifluoroacetate (Allyl TFA) | 1.00% | LiDFOB | EC, DMC | 96.29 | 1.59 |
| B6 | Methyl 2,2-difluoro-2-(fluorosulfonyl)acetate (MDFSA) | 1.00% | LiDFOB | EC, DMC | 97.86 | 0.67 |
| C6 | N-fluorobenzenesulfonimide (NFSI) | 0.25% | LiDFOB | EC, DMC | 97.17 | 1.16 |
| A7 | Disuccinimidyl carbonate (DSIC) | 0.25% | LiDFOB | EC, DMC | 98.06 | 0.93 |
| B7 | Bis(trimethylsilyl)carbodiimide (BTSC) | 0.25% | LiDFOB | EC, DMC | 97.40 | 1.03 |
| C7 | Methyl difluoroacetate (MDFA) | 1.00% | LiDFOB | EC, DMC | 97.92 | 0.81 |

Definitions

Unless otherwise explicitly recited herein, any reference to "secondary" or "rechargeable" cell is understood to refer to an electrochemical cell capable of undergoing repeated charge and discharge cycles.

Unless otherwise explicitly recited herein, any reference to "capacity" is understood to refer to amp-hours provided by the cell or device under normal operating conditions.

Unless otherwise explicitly recited herein, any reference to "non-aqueous fluid electrolyte" is understood to refer to a non-aqueous liquid electrolyte and not to a molten salt, gel, or dry, solid polymer electrolyte.

Unless otherwise explicitly recited herein, any reference to "additive" is understood to refer to a constituent of a non-aqueous liquid electrolyte, and not to a molten salt, gel, or polymer electrolyte, that comprises <10% by mass (wt %) of the non-aqueous fluid electrolyte.

Unless otherwise explicitly recited herein, any reference to "current collector" is understood to refer to any material capable of sufficiently conducting electrons.

Unless otherwise explicitly recited herein, any reference to an electronic signal or an electromagnetic signal (or their equivalents) is to be understood as referring to a non-volatile electronic signal or a non-volatile electromagnetic signal.

Unless otherwise explicitly recited herein, any reference to "record" or "recording" is understood to refer to a non-volatile or non-transitory record or a non-volatile or non-transitory recording.

Recording the results from an operation or data acquisition, for example, recording results such as an electrical signal having a particular frequency or wavelength, or recording an image or a portion thereof, is understood to mean and is defined herein as writing output data in a non-volatile or non-transitory manner to a storage element, to a machine-readable storage medium, or to a storage device. Non-volatile or non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A rechargeable electrochemical cell comprising:
a negative electrode;
a positive electrode;
an electronically insulating separator configured to separate said negative electrode and said positive electrode;
a non-aqueous electrolyte in direct physical contact with said negative electrode and said positive electrode, wherein lithium ions are the primary charge carrier, comprising:
at least one organic solvent;
at least one salt comprising at least two of the following elements: boron, fluorine, carbon, nitrogen, or oxygen; and
at least one additive from the following: pyrrolidones, sulfonimides, carbodimides, sulfonylfluorides, nitriles, isocyanates, fluoroacetates, silanes, triflate, halides, or organo-borates; and
at least one gate electrode having a gate electrode electrical terminal, said gate electrode in communication with said non-aqueous fluid electrolyte and permeable to at least one mobile species which is redox-active at at least one of said positive electrode or said negative electrode, said gate electrode situated between said positive electrode and said negative electrode,
wherein the rechargeable electrochemical cell has an anode Coulombic efficiency of greater than 99.35% at 25 degrees Celsius.

2. The rechargeable electrochemical cell of claim 1, wherein at least one electrolytically active lithium salt is selected from the group of salts consisting of lithium bis(perfluoroalkylsulfonyl)imide, lithium bis(fluorosulfonyl)imide, lithium bis(trifluoromethanesulfonyl)imide, lithium bis(perfluoroethylsulfonyl)imide, lithium di cyanamide, lithium tricyanomethide, lithium tetracyanoborate, lithium bis(oxalato)borate, lithium difluoro(oxalato)borate, lithium difluoro(malonato)borate, lithium tetrafluoroborate, lithium bis(benzenesulfonyl)imide, lithium triflate, lithium bis(perfluoropinacolato)borate, lithium bis(salicylato)borate, lithium perfluorobutanesulfonate, lithium thiocyanate, lithium triflinate, and lithium nitrate.

3. The rechargeable electrochemical cell of claim 2, comprising at least two electrolytically active lithium salts selected from those listed in claim 2.

4. The rechargeable electrochemical cell of claim 1, wherein at least one additive is selected from the group of chemicals consisting of 1-ethyl-2-pyrrolidone, carbon dioxide, N-fluorobenzenesulfonimide, allyl trifluoroacetate, vinyltrimethylsilane, tetra(isocyanato)silane, lithium bis(salicylato)borate, lithium triflate, lithium fluoride, perfluorobutanesulfonyl fluoride, lithium perfluorobutanesulfonate, lithium vinyltrifluoroborate, lithium halide, benzonitriles, 4-fluorobenzonitrile, 4-trifluoromethyl benzonitrile, benzonitrile, aryl isocyanates, 4-methoxyphenyl isocyanate, 1,3-phenylene diisocyanate, 1,4-phenylene diisocyanate, 3,5-bis(trifluoromethyl)phenyl isocyanate, 2-trifluoromethoxyphenyl isocyanate, alkyl isocyanates, ethyl isocyanate, pentyl isocyanate, octyl isocyanate, dodecyl isocyanate, 4-fluorobenzyl isocyanate, bis(trimethylsilyl)carbodiimide, 1-phenylpyrrolidine, N-nitrosopyrrolidine, Disuccinimidyl carbonate, lithium trifluoroacetate, methyl difluoroacetate, ethyl difluoroacetate, Ethyl 4,4,4-trifluoro(aceto)acetate, Methyl 2,2-difluoro-2-(fluorosulfonyl)acetate, Lithium nonafluorobutanesulfonate, Lithium 1,1,2,2,3,3-Hexafluoropropane-1,3-disulfonimide, N-fluorobenzenesulfonimide, methyl Cyanoacetate, chlorosulfonyl isocyanate.

5. The rechargeable electrochemical cell of claim 4, comprising at least two additives selected from the group of chemicals listed in claim 4.

6. The rechargeable electrochemical cell of claim 1, wherein each additive comprises greater than zero and less than ten percent by mass of the total electrolyte mass.

7. The rechargeable electrochemical cell of claim 1, wherein an anode polarization between electrodeposition and electrodissolution is less than 500 mV at 25 degrees Celsius.

8. The rechargeable electrochemical cell of claim 1, wherein the cell Coulombic efficiency is greater than 99.35% at 25 degrees Celsius.

9. The rechargeable electrochemical cell of claim 1, wherein the electrolyte solution comprises one or more liquid-infused polymers or gels.

10. The rechargeable electrochemical cell of claim 1, wherein said negative electrode and said positive electrode are configured such that a capacity of said negative electrode is strictly less than a capacity of said positive electrode.

11. The rechargeable electrochemical cell of claim 10, comprising lithium metal which is configured to plate onto a negative electrode current collector during charging.

12. The rechargeable electrochemical cell of claim 1, wherein a ratio of reversible capacity between said negative electrode and said positive electrode is such that Q(negative electrode)/Q(positive electrode)<0.9.

13. The rechargeable electrochemical cell of claim 1, configured to charge to greater than or equal to 4.3 V.

14. The rechargeable electrochemical cell of claim 1, configured to discharge to −2.5 V.

15. The rechargeable electrochemical cell of claim 1, configured to charge and discharge at <10 C-rate of rated capacity.

16. The rechargeable electrochemical cell of claim 1, configured to discharge and charge at temperatures in the range of −20° C. and 200° C.

17. The rechargeable electrochemical cell of claim 1, configured to provide at least 80% of initial capacity for greater than 30 charging and discharging cycles.

18. The rechargeable electrochemical cell of claim 1, wherein said negative electrode is configured to provide >1000 mAh/cc.

19. The rechargeable electrochemical cell of claim 1, wherein said non-aqueous electrolyte comprises a salt, or combination of salts in a concentration in the range of 0.5 M to saturated.

20. The rechargeable electrochemical cell of claim 1, wherein at least one of said negative electrode or positive electrode comprises one of a metal, an alloy, and an intermetallic compound.

21. The rechargeable electrochemical cell of claim 1, wherein at least one of said negative electrode or positive electrode comprises a material configured to undergo a reaction selected from the group of reactions consisting of an insertion reaction, an alloying, an intercalation, a disproportionation, a conversion reaction, or a combination thereof.

22. The rechargeable electrochemical cell of claim 1, wherein a pressure perpendicular to the interface of the positive and negative electrodes is greater than 0.06 MPa.

* * * * *